United States Patent
Gungor et al.

(10) Patent No.: US 10,475,094 B2
(45) Date of Patent: Nov. 12, 2019

(54) SYSTEMS AND METHODS FOR SEARCH RESULT COMPARISON

(71) Applicant: Wal-Mart Stores, Inc., Bentonville, AR (US)

(72) Inventors: Onur Gungor, Sunnyvale, CA (US); Manas Pathak, Sunnyvale, CA (US); Andrei Lopatenko, Cupertino, CA (US); Roger Yeh, Woodland, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 787 days.

(21) Appl. No.: 15/079,641

(22) Filed: Mar. 24, 2016

(65) Prior Publication Data

US 2017/0277692 A1    Sep. 28, 2017

(51) Int. Cl.
G06F 17/30 (2006.01)
G06Q 30/06 (2012.01)

(52) U.S. Cl.
CPC .................. *G06Q 30/0601* (2013.01)

(58) Field of Classification Search
CPC .................................. G06Q 30/0601
See application file for complete search history.

(56) References Cited

U.S. PATENT DOCUMENTS 7,752,077 B2    7/2010 Holden et al.
2015/0006280 A1*  1/2015 Ruiz ............... G06Q 30/00
                                                705/14.45

OTHER PUBLICATIONS

Product Detail—Compare Products: Printed Jun. 29, 2016 http://www.bestbuy.com/site/compare?skus=6422016,5412152,4380092&productString=1219661888984*1219650465773*1219627836001&url=%2Fsite%2Fsearchpage.jsp%3Fcp%3D2%26searchType%3Dsearch%26_dyncharset%3DUTF-8%26ks%3D960%26sc%3DGlobal%26list%3Dy%26usc%3DAll%2520Categories%26type%3Dpage%26id%3Dpcat17071%26iht%3Dn%26seeAll%3D%26browsedCategory%3Dpcmcat220700050011%26st%3Dpcmcat220700050011_categoryid%categoryid%2524abcat0101001%26qp%3Dfeatures_facet%253DSAAS~Features~Smart%2520Capable%255Ebrand_facet%253DBrand~Samsung Jun. 29, 2016.

* cited by examiner

*Primary Examiner* — Etienne P Leroux
*Assistant Examiner* — Husam Turki Samara
(74) *Attorney, Agent, or Firm* — Bryan Cave Leighton Paisner LLP

(57) ABSTRACT

In some embodiments, a method can comprise receiving a search query and performing a search based at least in part on the search query. In many embodiments, the search can return a plurality of search results, the plurality of search results can comprise a plurality of attributes. In some embodiments, the method can further comprise selecting at least two of the plurality of search results and sorting an order of the at least two of the plurality of search results by a ranking of the plurality of attributes of the at least two of the plurality of search results, the ranking of the at least two of the plurality of attributes of the plurality of search results based at least in part on a context of the search query. In many embodiments, the method can comprise facilitating display of the at least two of the plurality of search results. Other embodiments of related methods and systems are also provided.

30 Claims, 5 Drawing Sheets

400

405 – Receiving a search query.

410 – Performing a search based at least in part on the search query, the search returning a plurality of search results, the plurality of search results comprising a plurality of attributes.

415 – Selecting at least two of the plurality of search results

420 – Sorting an order of the at least two of the plurality of search results by a ranking of the plurality of attributes of the at least two of the plurality of search results, the ranking of the at least two of the plurality of attributes of the plurality of search results based at least in part on a context of the search query.

425 – Facilitating display of the at least two of the plurality of search results.

FIG. 4

SYSTEMS AND METHODS FOR SEARCH RESULT COMPARISON

TECHNICAL FIELD

This disclosure relates generally to systems and methods for search result comparison, and relates more particularly to systems for sorting an order of at least two search results selected by a user, and related methods.

BACKGROUND

When interacting with a search engine for an electronic commerce (eCommerce) website, users are able to view many different items offered by the eCommerce website. Many times, it can be time consuming for a user to view each item in the search results of the search engine in order to compare one item in the search results to other items in the search results. In addition, some items have multiple attributes that can vary. The ability to compare search results based at least in part on the attributes can assist the user in selecting an item on an eCommerce website for purchase through the eCommerce website. Accordingly, there is a need for systems and methods to provide better search result comparisons.

BRIEF DESCRIPTION OF THE DRAWINGS

To facilitate further description of the embodiments, the following drawings are provided in which:

FIG. 4 is a flowchart for a method, according to an embodiment; and

Figure 1:
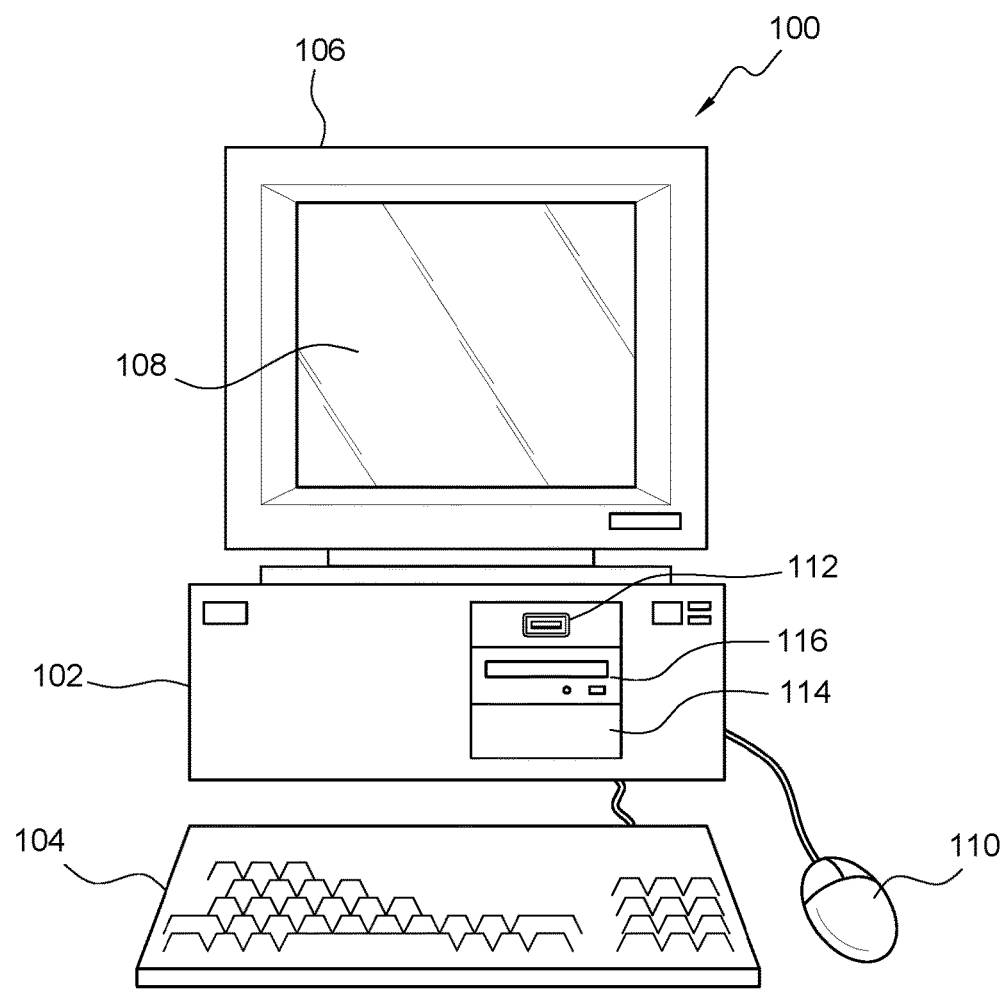
FIG. 1 illustrates a front elevation view of a computer system that is suitable for implementing at least part of a central computer system.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments can include a system. In many embodiments, the system can comprise one or more processing modules and one or more non-transitory storage modules storing computing instructions configured to run on the one or more processing modules and perform acts. In many embodiments, the acts can comprise receiving a search query and performing a search based at least in part on the search query, the search returning a plurality of search results, the plurality of search results comprising a plurality of attributes. In many embodiments, the acts can further comprise selecting at least two of the plurality of search results, sorting an order of the at least two of the plurality of search results by a ranking of the plurality of attributes of the at least two of the plurality of search results, the ranking of the plurality of attributes of the at least two of the plurality of search results based at least in part on a context of the search query, and facilitating display of the at least two of the plurality of search results.

Some embodiments include a method. In some embodiments, a method can comprise receiving a search query and performing a search based at least in part on the search query, the search returning a plurality of search results, the plurality of search results comprising a plurality of attributes. In many embodiments, the method can further comprise selecting at least two of the plurality of search results, sorting an order of the at least two of the plurality of search results by a ranking of the plurality of attributes of the at least two of the plurality of search results, the ranking of the at least two of the plurality of attributes of the plurality of search results based at least in part on a context of the search query, and facilitating display of the at least two of the plurality of search results.

Various embodiments of systems and methods for understanding product queries can include a method comprising receiving a search query and performing a search based at least in part on the search query, the search returning a plurality of search results, the plurality of search results comprising a plurality of attributes. In some embodiments, performing the search based at least in part of the search query can comprise searching based at least in part on natural language processing. In many embodiments, the method can further comprise selecting a first one of the plurality of search results, wherein selecting the first one of the plurality of search results comprises navigating to an item page of the first one of the plurality of search results. In a number of embodiments, the method can comprise determining a set of the plurality of search results based at least in part on the first one of the plurality of search items and a context of the search query, sorting an order of the set of plurality of search results by a ranking of the plurality of attributes of the set of the plurality of search results, the ranking of the plurality of attributes of the set of the plurality of search results based at least in part on the context of the search query, and facilitating display of a comparison of the first one of the plurality of search results and the set of the plurality of search results on the item page of the first one of the plurality of search results.

Figure 2:
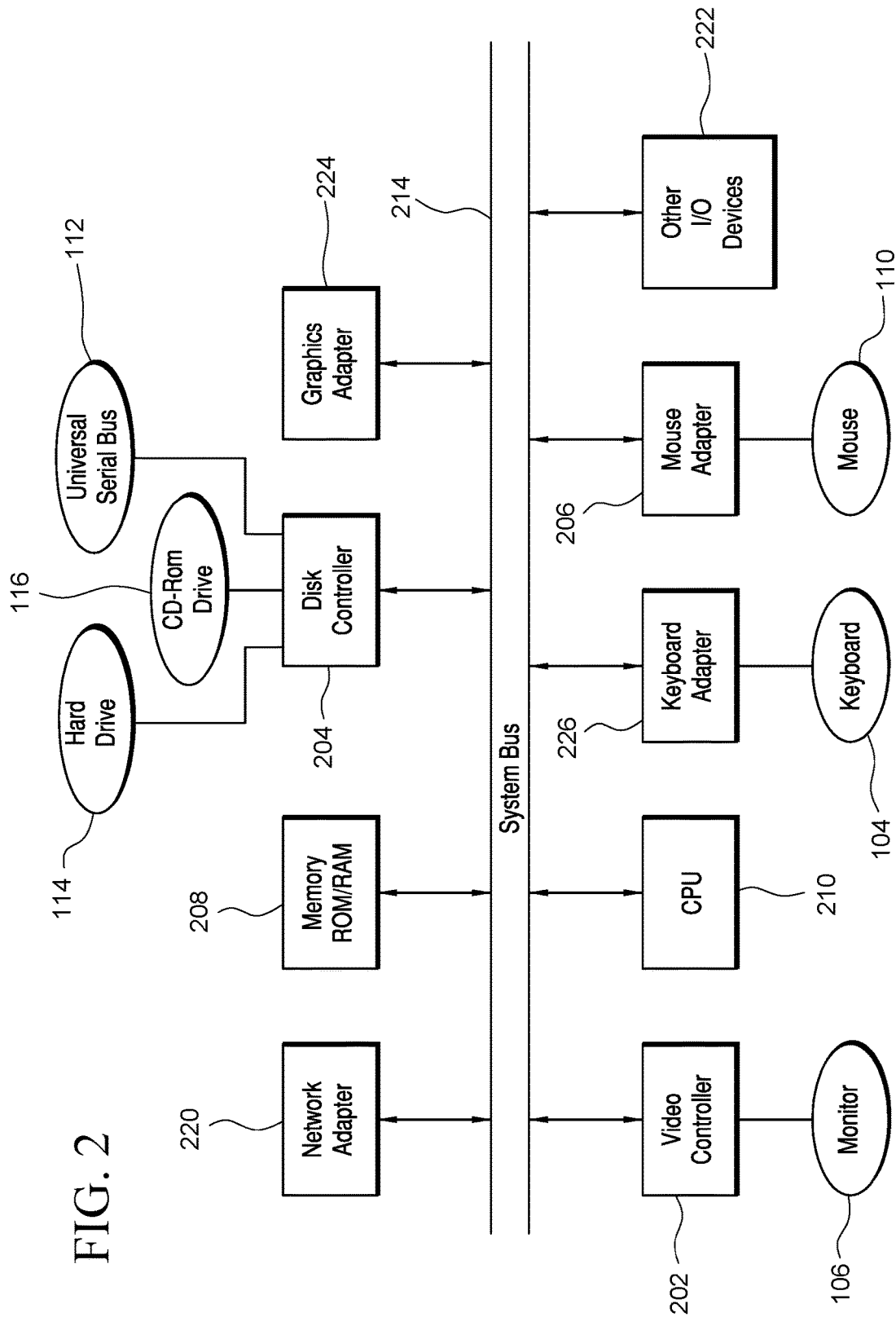
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
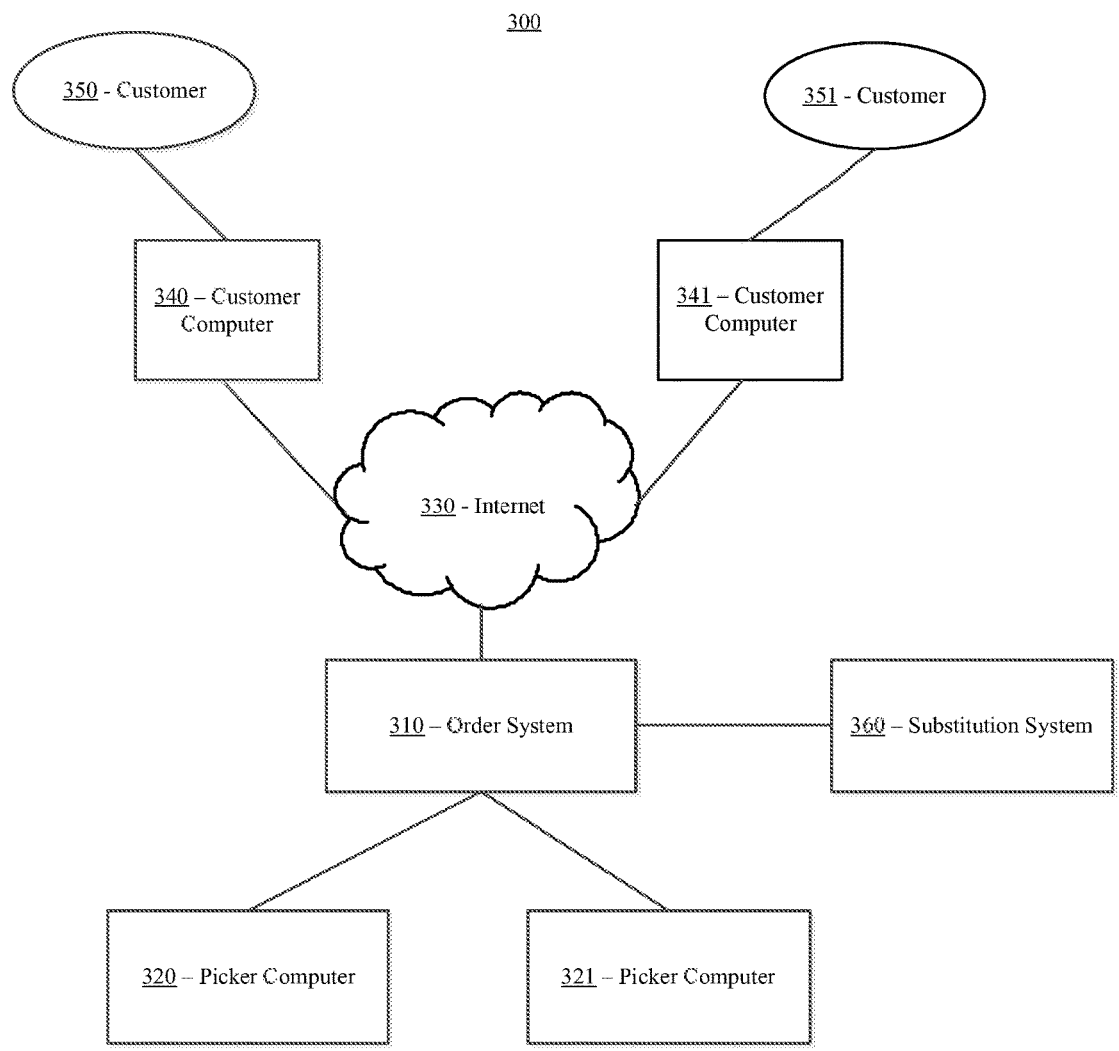
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In a number of embodiments, system 300 can comprise a search system 310, a comparison system 320, and a display system 360. In some embodiments, search system 310, comparison system 320, and display system 360 can each be a computer system 100 (FIG. 1), as described above, and can each be a single computer, a single server, or a cluster or collection of computers or servers. In some embodiments, search system 310 can be in communication with an inventory system (not shown) which can track distinct items (e.g., stock keeping units (SKUs)) in a product catalog, which can be ordered through the online retailer and which can be housed at one or more warehouses. In many embodiments, warehouses can comprise brick-and-mortar stores, distribution centers, and/or other storage facilities.

In many embodiments, search system 310, comparison system 320, and/or display system 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of search system 310, comparison system 320, and/or display system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of search system 310, comparison system 320, and/or display system 360. In a similar manner, the processing module(s) and the memory storage module(s) can be local and/or remote to each other.

In many embodiments, search system 310 and/or display system 360 can be configured to communicate with one or more customer computers 340 and 341. In some embodiments, customer computers 340 and 341 also can be referred to as user computers. In some embodiments, search system 310 and/or display system 360 can communicate or interface (e.g. interact) with one or more customer computers (such as customer computers 340 and 341) through a network or internet 330. Internet 330 can be an intranet that is not open to the public. Accordingly, in many embodiments, search system 310 and/or display system 360 (and/or the software used by such systems) can refer to a back end of system 300 operated by an operator and/or administrator of system 300, and customer computers 340 and 341 (and/or the software used by such systems) can refer to a front end of system 300 used by one or more customers 350 and 351, respectively. In some embodiments, customers 350 and 351 also can be referred to as users. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, search system 310, comparison system 320, and/or display system 360 also can be configured to communicate with one or more databases. The one or more database can comprise a product database that contains information about products, items, or SKUs sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between search system 310, comparison system 320, display system 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

Figure 5:
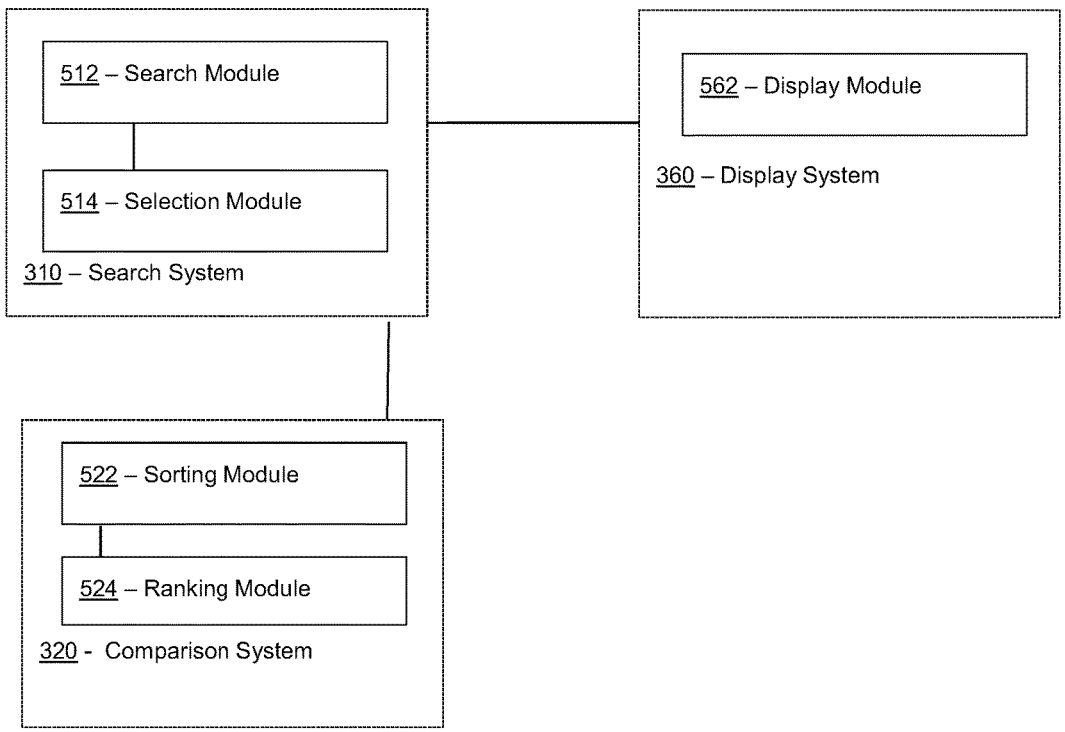
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 514, 522, 524, and/or 562 (FIG. 5). Such non-transitory memory storage modules can be part of a computer system such as search system 310 (FIGS. 3 & 5), comparison system 320 (FIGS. 3 & 5), and/or display system 360 (FIGS. 3 & 5). The processing module(s) can be similar or identical to the processing module(s) described above with respect to computer system 100 (FIG. 1).

Method 400 can comprise an activity 405 of receiving a search query. In many embodiments, the search query can be for an item (e.g., SKU) in a product catalog. In many embodiments, the product catalog can comprise one or more items. In many embodiments, method 400 can further comprise an activity 410 of performing a search based at least in part on the search query, the search returning a plurality of search results, the plurality of search results comprising a plurality of attributes. In many embodiments, the plurality of search results comprise a portion of the one or more items from the product catalog. In some embodiments, one of the attributes of the plurality of attributes can comprise a price for each item in the plurality of search results.

In many embodiments, a portion of the search results can be selected for comparison purposes. In some embodiments, method 400 can further comprise an activity 415 of selecting at least two of the plurality of search results. In many embodiments, the at least two of the plurality of search results can comprise a set of the plurality of search results. In some embodiments, the user (e.g. user 350 or 351 (FIG. 3)) can select the at least two of the plurality of search results. In a number of embodiments, the at least two of the plurality of search results or the set of the plurality of search results can be determined or selected based at least in part on context of the search query.

In various embodiments, method 400 can further comprise an activity 420 of sorting an order of the at least two of the plurality of search results by a ranking of the plurality of attributes of the at least two of the plurality of search results, the ranking of the at least two of the plurality of attributes of the plurality of search results based at least in part on a context of the search query.

In some embodiments, sorting the of the at least two of the plurality of search results by the ranking of the plurality of attributes of the at least of the two plurality of search results can comprise sorting the ranking of the plurality of attributes of the at least two of the plurality of search results by importance, the importance based at least in part on the context of the search query. In some embodiments, the method can further comprise re-ordering at least one of the at least two of the plurality of search results based on a value of a top-ranked attribute of the plurality of attributes, the top-ranked attribute of the plurality of attributes based on the ranking of the plurality of attributes of the at least two of the plurality of search results. In some embodiments, the top-ranked attribute of the plurality of attributes can comprise the price (e.g., the lowest price might be preferred). In other embodiments, the top-ranked attribute of the plurality of attributes can comprise the brand, the size (e.g., the largest screen size for a television might be preferred), or the weight (e.g., the lightest weight for a laptop computer might be preferred).

In a number of embodiments, sorting the order of the at least two of the plurality of search results by the ranking of the plurality of attributes of the at least two of the plurality of search results can be based at least in part on an engagement score of each of the at least two of the plurality of search results. In some embodiments, the engagement score of each of the plurality of search results can be based at least in part on a popularity of each search result of the plurality of search results over a time period. In some embodiments, the time period can comprise approximately 24 hours, one week, two weeks, one month, two months, three months, one calendar quarter, 180 days, or one year. In various embodiments, the popularity of each search result of the plurality of search results can comprise at least one of a number of clicks on the search result of the plurality of search results (e.g., num$_{clicks}$ in Formula 1, below), a number of post-click add-to-carts of the search result of the plurality of search results (e.g., num$_{add\ to\ carts}$ in Formula 1, below), or a number of post-click orders of the search result of the plurality of search results (e.g., num$_{orders}$ in Formula 1, below). In some embodiments, the engagement score of each search result of the plurality of search results can be determined according to Formula 1:

item$_{score}$(x)=num$_{clicks}$+α$_1$*num$_{add\ to\ carts}$+α$_2$*num$_{orders}$ wherein x is one of the plurality of search results and constants α$_1$ and α$_2$ are globally fixed across all search queries. In some embodiments, the popularity of each search result of the plurality of search results can be determined according to a method taught in U.S. patent application Ser. No. 15/011,498, filed on Jan. 30, 2016, entitled "Systems and Methods for Browse Facet Ranking," which is herein incorporated by reference in its entirety.

In many embodiments, sorting the order of the at least two of the plurality of search results by the ranking of the plurality of attributes of the at least two of the plurality of search results can be based at least in part on an attribute value engagement score of each of the plurality of attributes. In some embodiments, the attribute value engagement score of each of the plurality of attributes is based at least in part on an attribute popularity of an attribute of the plurality of attributes over a time period. In some embodiments, the time period can comprise approximately 24 hours, one week, two weeks, one month, two months, three months, one calendar quarter, 180 days, or one year. In a number of embodiments, the attribute popularity of the attribute of the plurality of attributes can comprise at least one of a number of clicks on the attribute of the plurality of attributes, a number of post-click add-to-carts of the attribute of the plurality of attributes, or a number of post-click orders of the attribute of the plurality of attributes.

In some embodiments, sorting the order of the plurality of attributes can be based on item price, a probability that one of the plurality of search results will be purchased or selected by the user (e.g., clicked on and/or added to the checkout cart), and/or an attribute value probability that one of the plurality of attributes will be an attribute selected by the user (e.g., clicked on). In some embodiments, the item price can be described using the item attributes, which is a supervised learning problem to predict an attribute value that makes the item more valuable or not. Therefore, Formulas 2-15, described below, can be replaced with alternate formulas depending on the technique used. In some embodiments, the probability of one of the plurality of search results can be determined according to Formula 2:

$$p(x) = \frac{item_{score}(x)}{\sum_{x'} item_{score}(x')}$$

wherein x' is a dummy index and the denominator indicates a sum of item scores of all items.

In some embodiments, an attribute value probability can be obtained from the engagement score and/or the attribute value engagement score. In some embodiments, the attribute value probability can be a weighted combination of the probability of items tagged to the attribute value (e.g., the first parenthetical of Formula 3 below) and the attribute value engagement score (e.g., the second parenthetical of Formula 3 below). In many embodiments, the attribute value probability can be determined according to Formula 3:

$$p(i, j) = w \frac{\sum_{x: x \in \rho(i,j)} p(x)}{\sum_{i'=1}^{K} \sum_{j'=1}^{K_i} \sum_{x': x' \in \rho(i',j')} p(x')} + (1-w) \frac{av_{score(i,j)}}{\sum_{i'=1}^{K} \sum_{j'=1}^{K_i} av_{score(i',j')}}$$

wherein ρ(i,j) is the set of items of the plurality of search results that have attribute values i, j (e.g., if i=resolution and j=4k TVs, then it is the set of 4k TVs). The fraction in the first parenthetical is a normalization of combination of probability of items tagged to the attribute value. The fraction in the second parenthetical is a normalization of the attribute value engagement scores, wherein the denominator is the sum of attribute value engagement scores across all attributes and all attribute values, K is the number of attributes, K$_i$ is the number of attribute values of attribute i, and w is a non-negative constant that is the same across all search queries.

A conditional probability of an item i of the plurality of search results can be determined according to Formula 4:

$$p(x \mid i, j) = \frac{p(x)}{\sum_{x' \in \rho(i,j)} p(x')}$$

wherein the denominator of Formula 4 is a summation of probability of all items tagged to attribute i, attribute j.

Because ρ(i,j) is the set of items of the plurality of search results that have attribute values i, j, then the number of items with positive probability can be determined by Formula 5:

$$n(i,j)=\Sigma_{x\in\rho(i,j):p(x)>0}1.$$

In many embodiments, an expected item price given an attribute value (e.g., E(v|i,j) in Formula 6 described below). The expected item price given the attribute value can provide the average price of items that have the attribute and attribute value (e.g., the average price of items with an attribute of "resolution" and attribute value of "1080p" is $300, whereas the average price of items with an attribute of "resolution" and an attribute value of "4K UHD" is $500). In many embodiments, a weighted average can be used (e.g., weighted with probability, p(x|i,j) to put more weight on items that are popular, which can filter out irrelevant items and/or outliers). In some embodiments, the expected item price given the attribute value can be determined according to Formula 6:

$$E(v \mid i, j) = \sum_{x} p(x \mid i, j)v(x)$$

wherein v is item price. In some embodiments, instead of using Formula 6, Formula 7 can be used as a confidence correction to account for sparse data and also can be used to replace an expected item price given an attribute value:

$$E(v \mid i, j) = (1 - n(i, j)^{-\alpha_0}) \sum_{x} p(x \mid i, j)v(x)$$

wherein $\alpha_0$ is a positive constant that is the same across all search queries and n is number of observations of items with attributes i,j. The confidence corrected expected item price given the attribute value is an increasing function of number of observations n(i,j).

In some embodiments, a variance of an item price given an attribute value (e.g., var(v|i,j) in Formula 8 described below) can provide a sample variance of prices of items that have the same attribute and a same value of the attribute. In some embodiments, the variance of the item price given the attribute value can be utilized to determine whether the average prices of items with different attributes are different (e.g., testing the null hypothesis). In some embodiments, the variance of the item price given the attribute value can be determined according to Formula 8:

$$\mathrm{var}(v|i,j)=\Sigma_x p(x|i,j)(v(x)-E(v|i,j))^2.$$

In a number of embodiments, an expected item price can be averaged over all attribute values for each attribute according to Formula 9:

$$E(v|i)=E(E(v|i,j))=\Sigma_{j=i}^{K_i} p(i,j)E(v|i,j).$$

In further embodiments, the variance of the expected item price can determine how much the mean prices of different attribute values differ. In many embodiments, the variance of the expected item price can be determined according to Formula 10:

$$\mathrm{var}(E(v|i,j))=\Sigma_{j=1}^{K_i} p(i,j)(E(v|i,j)-E(v|i))^2.$$

In many embodiments, variance of prices of items that have the same attribute value can be determined according to Formula 11:

$$E(\mathrm{var}(v|i,j))=\Sigma_{j=1}^{K_i} p(i,j)\mathrm{var}(v|i,j).$$

In some embodiments, attributes can be ranked according to the variance of the expected item price and the expectation of the variance of item price (e.g., Formulas 10 and 11). In some embodiments, the attributes can be ranked with a confidence correction. In many embodiments, the attributes can be ranked according to Formula 12:

$$\mathrm{attribute}_{finalscore}(i)=\mathrm{var}(E(v|i,j))-\alpha_1 E(\mathrm{var}(v|i,j))$$

wherein $\alpha_1$ is a positive constant that is the same across all search queries.

Score boundaries can be determined according to a lower score boundary and an upper score boundary. In some embodiments, the lower score boundary can be determined by Formula 13:

$$\mathrm{attributevalue}_{finalscorelower}(i,j)=E(v|i,j)-\alpha_2\sqrt{\mathrm{var}(v|i,j)}$$

and the upper score boundary can be determined by Formula 14:

$$\mathrm{attributevalue}_{finalscoreupper}(i,j)=E(v|i,j)+\alpha_2\sqrt{\mathrm{var}(v|i,j)}$$

wherein $\alpha_2$ is a positive constant that is the same across all search queries.

In various embodiments, when comparing attribute value (i,j) with attribute value (i, j'), attribute value (i,j) can be determined according to Formula 15 to be better or preferred over attribute value (i, j') if $$\mathrm{attributevalue}_{finalscorelower}(i,j)>\mathrm{attributevalue}_{finalscoreupper}(i,j').$$

In one embodiment, using Formulas 2-15 as described above, a search for "tv" can result in determining that a 4k UHD television is better or preferred over a 1080p television and that a 120 Hz television is better than 60 Hz television. Assuming a search query for "tv" and assuming that the constants are selected as w=0, $\alpha_0$=infinity, $\alpha_1$=0.1, and $\alpha_2$=0.1, the following TV product rankings are shown in Table 1 below.

TABLE 1

| Item id (x) | Item engagement score Item_score(x) | Item price v(x) | Attribute i | Attribute value j | Attribute value score av_score(i, j) |
|---|---|---|---|---|---|
| ITEM2 | 4 | 800 | Resolution | 4K UHD | 4 |
| ITEM2 | 4 | 800 | Refresh rate | 120 Hz | 2 |
| ITEM3 | 2 | 600 | Resolution | 4K UHD | 4 |
| ITEM3 | 2 | 600 | Refresh rate | 60 Hz | 1 |
| ITEM4 | 6 | 400 | Resolution | 1080p | 3 |
| ITEM4 | 6 | 400 | Refresh rate | 120 Hz | 2 |
| ITEM6 | 8 | 250 | Resolution | 1080p | 3 |
| ITEM6 | 8 | 250 | Refresh rate | 60 Hz | 1 |

Note that, the item engagement score is a function of item id and query, and the attribute value score is only a function of attribute, attribute value, and query. Here, the dependence on user query is omitted in order to simplify notation. From Table 1, it can be seen that a 4K UHD TV attribute is more popular compared to a 1080p TV attribute, and 120 Hz is more popular compared to 60 Hz.

Continuing to use Formulas 2-15, item probability, attribute value probability, conditional item probability, and the number of items with the same attribute value can be determined, as shown in Table 2 below.

TABLE 2

| Item id (x) | Item probability p(x) | Item price v(x) | Attribute I | Attribute value j | Attribute value probability p(i, j) | Conditional item probability p(x\|i, j) | Number of items with same av n(i, j) |
|---|---|---|---|---|---|---|---|
| ITEM2 | 0.2 | 900 | Resolution | 4K UHD | 0.4 | 0.5625 | 2 |
| ITEM2 | 0.2 | 900 | Refresh rate | 120 Hz | 0.2 | 0.5625 | 2 |
| ITEM3 | 0.1 | 600 | Resolution | 4K UHD | 0.4 | 0.375 | 2 |
| ITEM3 | 0.1 | 600 | Refresh rate | 60 Hz | 0.1 | 0.375 | 2 |
| ITEM4 | 0.3 | 400 | Resolution | 1080p | 0.3 | 0.4583 | 2 |
| ITEM4 | 0.3 | 400 | Refresh rate | 120 Hz | 0.2 | 0.4583 | 2 |
| ITEM6 | 0.4 | 250 | Resolution | 1080p | 0.3 | 0.5312 | 2 |
| ITEM6 | 0.4 | 250 | Refresh rate | 60 Hz | 0.1 | 0.5312 | 2 |

Next, for each attribute value, the expected item price and item price variance can be determined, as shown in Table 3 below.

TABLE 3

| Attribute I | Attribute value j | Attribute value probability P(i, j) | Expected item price (no conf. correction) E[v\|i, j]) | Item price variance Var(v\|i, j) |
|---|---|---|---|---|
| Resolution | 4K UHD | 0.4 | 800 | 20000 |
| Resolution | 1080P | 0.3 | 315 | 5510 |
| Refresh rate | 120 Hz | 0.2 | 600 | 60000 |
| Refresh rate | 60 Hz | 0.1 | 320 | 19600 |

Following the determinations found in Table 3, for each attribute, the expected price, variance of expected price, and expectation of item price variance can be determined, as shown in Table 4 below.

TABLE 4

| Attribute i | Expected price E[v\|i] | Variance of expected price Var(E[v\|i, j]) | Expectation of item price variance E[var(v\|i, j)] |
|---|---|---|---|
| Resolution | 592 | 57606 | 13790 |
| Refresh rate | 506 | 17422 | 46500 |

Next, attributes can be ranked. As shown in Table 5, resolution is ranked higher than refresh rate.

TABLE 5

| Attribute i | attribute_final_score(i) |
|---|---|
| Resolution | 56227 |
| Refresh rate | 12722 |

Finally, attribute values can be ranked, as shown in Table 6.

From Table 6, it can be seen that 4k UHD is better than 1080p, because 658.5>322.4 and 120 Hz is better than 60 Hz because 355>334. When ranking the at least two of the plurality of search results, the higher ranked attributes and/or attributes values can be ranked higher (e.g., TVs with resolution attributes ranked first, and 4k UHD TVs ranked above 1080p TVs).

In some embodiments, method 400 can further comprise an activity 425 of facilitating display of the at least two of the plurality of search results. In many embodiments, facilitating display of the at least two of the plurality of search results can comprise formatting the at least two of the plurality of search results into a grid or a table. In some embodiments, method 400 can further comprise indicating a difference between a first value of a first attribute of the plurality of attributes of a first search result of the plurality of search results, and a second value of the first attribute of the plurality of attributes of a second search result of the plurality of search results. In many embodiments, indicating the difference can comprise highlighting, italicizing, bolding, changing font size, and/or underlining the attributes and/or attribute values that are different.

In a number of embodiments, method 400 can further comprise selecting a first one of the plurality of search results, wherein selecting the first one of the plurality of search results comprises navigating to an item page of the first one of the plurality of search results. In many embodiments, a set of the plurality of search results can be determined based at least in part on the first one of the plurality of search items and a context of the search query. In these and other embodiments, method 400 can comprise facilitating display of a comparison of the first one of the plurality of search results and the set of the plurality of search results on the item page of the first one of the plurality of search results. In some embodiments, a unique identification corresponding to a user session within the website can be obtained (e.g., session id). In some embodiments, the set of the plurality of search results can be determined by deter-

| Attribute i | Attribute value j | Expected item price (no conf. correction) E[v\|i, j] | Item price variance Var(v\|i, j) | Attribute_value_Final_Score_upper_bound | Attribute_value_Final_Score_lower_bound |
|---|---|---|---|---|---|
| Resolution | 4K UHD | 800 | 20000 | 814.1 | 658.5 |
| Resolution | 1080P | 315 | 5510 | 322.4 | 240.7 |
| Refresh rate | 120 Hz | 600 | 60000 | 624.4 | 355 |
| Refresh rate | 60 Hz | 320 | 19600 | 334 | 180 | mining a list of items within the plurality of search results within the user session have been previously selected or previously clicked on (e.g., list of clicked item ids) by the user (e.g. user 350 or 351 (FIG. 3)), as shown in Table 7.

TABLE 7

| Session id | List of clicked item ids |
|---|---|
| 1 | ITEM1, ITEM3, ITEM5, ITEM8 |
| 2 | ITEM1, ITEM3, ITEM8 |
| 3 | ITEM4, ITEM8, ITEM9 |
| 4 | ITEM3, ITEM8, ITEM9 |

In many embodiments, method 400 can further comprise sorting the list of items within the plurality of search results by the number of sessions wherein each item has been selected or clicked on by a user (e.g. user 350 or 351 (FIG. 3)), as shown in Table 8, wherein ITEM8 is the first one of the plurality of search results.

TABLE 8

| Item_id | Item_id2 | # sessions the items are clicked together |
|---|---|---|
| ITEM8 | ITEM3 | 3 |
| ITEM8 | ITEM1 | 2 |
| ITEM8 | ITEM9 | 2 |
| ITEM8 | ITEM4 | 1 |
| ITEM8 | ITEM5 | 1 |

In some embodiments, method 400 can further comprise filtering out items within the plurality of search results that are not in a same category or shelf as the first one of the plurality of search results. Table 9 shows a listing of the shelves for each item of the plurality of search results remaining from Table 8.

TABLE 9

| Item_id | Shelf |
|---|---|
| ITEM1 | Home -> Furniture -> TV Stands |
| ITEM3 | Electronics -> TV & Video -> All TVs |
| ITEM4 | Electronics -> TV & Video -> All TVs |
| ITEM5 | Home -> Furniture -> TV Stands |
| ITEM8 | Electronics -> TV & Video -> All TVs |
| ITEM9 | Electronics -> TV & Video -> All TVs |

In Table 9, if ITEM8 is the first one of the plurality of search results, it can be seen that ITEM1 and ITEM5 are not in the same shelf as ITEM8, therefore these items are removed as shown in Table 10. In some embodiments, the set of the plurality of search results shown in the comparison on the item page of the first one of the plurality of search results comprise the at least a portion remaining items (e.g., the items remaining in Table 10, ITEM3, ITEM9, and/or ITEM4). In many embodiments, the number of items in the set of the plurality of search results can depend at least in part on available space on the website, a window size on a desktop computer, or a screen size on a mobile device.

TABLE 10

| Item_id | Item_id2 | # sessions the items are clicked together |
|---|---|---|
| ITEM8 | ITEM3 | 3 |
| ITEM8 | ITEM9 | 2 |
| ITEM8 | ITEM4 | 1 |

FIG. 5 illustrates a block diagram of a portion of system 300 comprising search system 310, comparison system 320, and/or display system 360, according to the embodiment shown in FIG. 3. each of search system 310, comparison system 320, and/or display system 360 are merely exemplary and are not limited to the embodiments presented herein. Each of search system 310, comparison system 320, and/or display system 360 can be employed in many different embodiments or examples not specifically depicted or described herein. In some embodiments, certain elements or modules of search system 310, comparison system 320, and/or display system 360 can perform various procedures, processes, and/or acts. In other embodiments, the procedures, processes, and/or acts can be performed by other suitable elements or modules.

In many embodiments, search system 310 can comprise non-transitory memory storage modules 512 and 514, comparison system 320 can comprise non-transitory memory storage modules 522 and 524, and display module can comprise a non-transitory memory storage modules 562. Memory storage module 512 can be referred to as a search module 512, and memory storage module 514 can be referred to as a selection module 514. Memory storage module 522 can be referred to as a sorting module 522, and memory storage module 524 can be referred to as a ranking module 524. Memory storage module 562 can be referred to as a display module 562.

In many embodiments, search module 512 can store computing instructions configured to run on one or more processing modules and perform one or more acts of methods 400 (FIG. 4) (e.g., activity 410 of performing a search based at least in part on the search query, the search returning a plurality of search results, the plurality of search results comprising a plurality of attributes (FIG. 4)). In some embodiments, selection module 514 can store computing instructions configured to run on one or more processing modules and perform one or more acts of methods 400 (FIG. 4) (e.g., activity 415 of selecting at least two of the plurality of search results (FIG. 4)). In many embodiments, sorting module 522 and/or ranking module 524 can store computing instructions configured to run on one or more processing modules and perform one or more acts of methods 400 (FIG. 4) (e.g., activity 420 of sorting an order of the at least two of the plurality of search results by a ranking of the plurality of attributes of the at least two of the plurality of search results, the ranking of the at least two of the plurality of attributes of the plurality of search results based at least in part on a context of the search query. (FIG. 4)). In some embodiments, display module 562 can store computing instructions configured to run on one or more processing modules and perform one or more acts of methods 400 (FIG. 4) (e.g., activity 425 of facilitating display of the at least two of the plurality of search results (FIG. 4)).

Although systems and methods for search result comparison been described above, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the activities of FIGS. 3-5 may include different activities and/or be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions configured to run on the one or more processors and perform:
receiving a search query;
performing a search based at least in part on the search query, the search returning a plurality of search results, the plurality of search results comprising a plurality of attributes and a plurality of attribute values;
determining an expected item price for items in the plurality of search results based on attributes and attribute values of the items, wherein the expected item price for first items of the items that include a particular attribute value is an average price of the first items, wherein the plurality of attributes comprise the attributes, and wherein the plurality of attribute values comprise the attribute values and the particular attribute value;
selecting at least two of the plurality of search results;
sorting an order of the at least two of the plurality of search results by a ranking of the plurality of attributes of the at least two of the plurality of search results, the ranking of the plurality of attributes of the at least two of the plurality of search results being based at least in part on a context of the search query and the expected item price for the items in the plurality of search results; and
facilitating display of the at least two of the plurality of search results using the order of the at least two of the plurality of search results based on the ranking of the plurality of attributes of the at least two of the plurality of search results.

2. The system of claim 1, wherein:
sorting the order of the at least two of the plurality of search results by the ranking of the plurality of attributes of the at least two of the plurality of search results comprises sorting the ranking of the plurality of attributes of the at least two of the plurality of search results by importance, the importance based at least in part on the context of the search query.

3. The system of claim 2, wherein the computing instructions are further configured to perform:
re-ordering the at least two of the plurality of search results based on a value of a top-ranked attribute of the plurality of attributes, the top-ranked attribute of the plurality of attributes based on the ranking of the plurality of attributes of the at least two of the plurality of search results.

4. The system of claim 1, wherein:
sorting the order of the at least two of the plurality of search results by the ranking of the plurality of attributes of the at least two of the plurality of search results is based at least in part on an engagement score of each of the at least two of the plurality of search results.

5. The system of claim 4, wherein:
the engagement score of each of the at least two of the plurality of search results is based at least in part on a popularity of each search result of the plurality of search results over a time period.

6. The system of claim 5, wherein:
the popularity of each search result of the plurality of search results comprises at least one of:
a number of clicks on the search result of the plurality of search results;
a number of post-click add-to-carts of the search result of the plurality of search results; or
a number of post-click orders of the search result of the plurality of search results.

7. The system of claim 1, wherein:
sorting the order of the at least two of the plurality of search results by the ranking of the plurality of attributes of the at least two of the plurality of search results is based at least in part on an attribute value engagement score of each of the plurality of attributes.

8. The system of claim 7, wherein:
the attribute value engagement score of each of the plurality of attributes is based at least in part on an attribute popularity of an attribute of the plurality of attributes over a time period.

9. The system of claim 8, wherein:
the attribute popularity of the attribute of the plurality of attributes comprises at least one of:
a number of clicks on the attribute of the plurality of attributes;
a number of post-click add-to-carts of the attribute of the plurality of attributes; or
a number of post-click orders of the attribute of the plurality of attributes.

10. The system of claim 1, wherein:
sorting the order of the at least two of the plurality of search results by the ranking of the plurality of attributes of the at least two of the plurality of search results comprises sorting the ranking of the plurality of attributes of the at least two of the plurality of search results by importance, the importance based at least in part on the context of the search query;
the computing instructions are further configured to perform:
re-ordering the at least two of the plurality of search results based on a value of a top-ranked attribute of the plurality of attributes, the top-ranked attribute of the plurality of attributes based on the ranking of the plurality of attributes of the at least two of the plurality of search results;
sorting the order of the at least two of the plurality of search results by the ranking of the plurality of attributes of the at least two of the plurality of search results is based at least in part on an engagement score of each of the at least two of the plurality of search results;
the engagement score of each of the at least two of the plurality of search results is based at least in part on a popularity of each search result of the plurality of search results over a time period;
the popularity of each search result of the plurality of search results comprises at least one of:
a number of clicks on the search result of the plurality of search results;
a number of post-click add-to-carts of the search result of the plurality of search results; or
a number of post-click orders of the search result of the plurality of search results;
sorting the order of the at least two of the plurality of search results by the ranking of the plurality of attributes of the at least two of the plurality of search results is further based at least in part on an attribute value engagement score of each of the plurality of attributes;
the attribute value engagement score of each of the plurality of attributes is based at least in part on an attribute popularity of an attribute of the plurality of attributes over a time period; and
the attribute popularity of the attribute of the plurality of attributes comprises at least one of:
a number of clicks on the attribute of the plurality of attributes;
a number of post-click add-to-carts of the attribute of the plurality of attributes; or
a number of post-click orders of the attribute of the plurality of attributes.

11. A method comprising:
receiving a search query;
performing a search based at least in part on the search query, the search returning a plurality of search results, the plurality of search results comprising a plurality of attributes and a plurality of attribute values;
determining an expected item price for items in the plurality of search results based on attributes and attribute values of the items, wherein the expected item price for first items of the items that include a particular attribute value is an average price of the first items;
selecting at least two of the plurality of search results;
sorting an order of the at least two of the plurality of search results by a ranking of the plurality of attributes of the at least two of the plurality of search results, the ranking of the at least two of the plurality of attributes of the plurality of search results being based at least in part on a context of the search query and the expected item price for the items in the plurality of search results; and
facilitating display of the at least two of the plurality of search results using the order of the at least two of the plurality of search results based on the ranking of the plurality of attributes of the at least two of the plurality of search results.

12. The method of claim 11, wherein:
sorting the order of the at least two of the plurality of search results by the ranking of the plurality of attributes of the at least two of the plurality of search results comprises sorting the ranking of the plurality of attributes of the at least two of the plurality of search results by importance, the importance based at least in part on the context of the search query.

13. The method of claim 12, further comprising
re-ordering the at least two of the plurality of search results based on a value of a top-ranked attribute of the plurality of attributes, the top-ranked attribute of the plurality of attributes based on the ranking of the plurality of attributes of the at least two of the plurality of search results.

14. The method of claim 11, wherein:
sorting the order of the at least two of the plurality of search results by the ranking of the plurality of attributes of the at least two of the plurality of search results is based at least in part on an engagement score of each of the at least two of the plurality of search results.

15. The method of claim 14, wherein:
the engagement score of each of the plurality of search results is based at least in part on a popularity of each search result of the plurality of search results over a time period.

16. The method of claim 15, wherein:
the popularity of each search result of the plurality of search results comprises at least one of:
a number of clicks on the search result of the plurality of search results;
a number of post-click add-to-carts of the search result of the plurality of search results; or
a number of post-click orders of the search result of the plurality of search results.

17. The method of claim 11, wherein:
sorting the order of the at least two of the plurality of search results by the ranking of the plurality of attributes of the at least two of the plurality of search results is based at least in part on an attribute value engagement score of each of the plurality of attributes.

18. The method of claim 17, wherein:
the attribute value engagement score of each of the plurality of attributes is based at least in part on an attribute popularity of an attribute of the plurality of attributes over a time period.

19. The method of claim 18, wherein:
the attribute popularity of the attribute of the plurality of attributes comprises at least one of:
a number of clicks on the attribute of the plurality of attributes;
a number of post-click add-to-carts of the attribute of the plurality of attributes; or
a number of post-click orders of the attribute of the plurality of attributes.

20. The method of claim 11, wherein:
sorting the order of the at least two of the plurality of search results by the ranking of the plurality of attributes of the at least two of the plurality of search results comprises sorting the ranking of the plurality of attributes of the at least two of the plurality of search results by importance, the importance based at least in part on the context of the search query;
the method further comprises:
re-ordering the at least two of the plurality of search results based on a value of a top-ranked attribute of the plurality of attributes, the top-ranked attribute of the plurality of attributes based on the ranking of the plurality of attributes of the at least two of the plurality of search results;
sorting the order of the at least two of the plurality of search results by the ranking of the plurality of attributes of the at least two of the plurality of search results is based at least in part on an engagement score of each of the at least two of the plurality of search results;
the engagement score of each of the at least two of the plurality of search results is based at least in part on a popularity of each search result of the plurality of search results over a time period;
the popularity of each search result of the plurality of search results comprises at least one of:

a number of clicks on the search result of the plurality of search results;

a number of post-click add-to-carts of the search result of the plurality of search results; or a number of post-click orders of the search result of the plurality of search results;

sorting the order of the at least two of the plurality of search results by the ranking of the plurality of attributes of the at least two of the plurality of search results is further based at least in part on an attribute value engagement score of each of the plurality of attributes;

the attribute value engagement score of each of the plurality of attributes is based at least in part on an attribute popularity of an attribute of the plurality of attributes over a time period; and the attribute popularity of the attribute of the plurality of attributes comprises at least one of:
 a number of clicks on the attribute of the plurality of attributes;
 a number of post-click add-to-carts of the attribute of the plurality of attributes; or
 a number of post-click orders of the attribute of the plurality of attributes.

21. A method comprising:

receiving a search query;

performing a search based at least in part on the search query, the search returning a plurality of search results, the plurality of search results comprising a plurality of attributes and a plurality of attribute values;

determining an expected item price for items in the plurality of search results based on attributes and attribute values of the items, wherein the expected item price for first items of the items that include a particular attribute value is an average price of the first items;

selecting a first one of the plurality of search results, wherein selecting the first one of the plurality of search results comprises navigating to an item page of the first one of the plurality of search results;

determining a set of the plurality of search results based at least in part on the first one of the plurality of search results and a context of the search query;

sorting an order of the set of the plurality of search results by a ranking of the plurality of attributes of the set of the plurality of search results, the ranking of the plurality of attributes of the set of the plurality of search results being based at least in part on the context of the search query and the expected item price for the items in the plurality of search results; and facilitating display of a comparison of the first one of the plurality of search results and the set of the plurality of search results on the item page of the first one of the plurality of search results using the order of at least two of the plurality of search results based on the ranking of the plurality of attributes of the at least two of the plurality of search results.

22. The method of claim 21, wherein:

sorting the order of the set of the plurality of search results by the ranking of the plurality of attributes of the set of the plurality of search results comprises sorting the ranking of the plurality of attributes of the set of the plurality of search results by importance, the importance based at least in part on the context of the search query.

23. The method of claim 22, further comprising re-ordering the set of the plurality of search results based on a value of a top-ranked attribute of the plurality of attributes, the top-ranked attribute of the plurality of attributes based on the ranking of the plurality of attributes of the set of the plurality of search results.

24. The method of claim 21, wherein:

sorting the order of the set of the plurality of search results by the ranking of the plurality of attributes of the set of the plurality of search results is based at least in part on an engagement score of each of the set of the plurality of search results.

25. The method of claim 24, wherein:

the engagement score of each of the set of the plurality of search results is based at least in part on a popularity of each search result of the set of the plurality of search results over a time period.

26. The method of claim 25, wherein:

the popularity of each search result of the set of the plurality of search results comprises at least one of:
 a number of clicks on the search result of the set of the plurality of search results;
 a number of post-click add-to-carts of the search result of the set of the plurality of search results; or
 a number of post-click orders of the search result of the set of the plurality of search results.

27. The method of claim 21, wherein:

sorting the order of the set of the plurality of search results by the ranking of the plurality of attributes of the set of the plurality of search results is based at least in part on an attribute value engagement score of each of the plurality of attributes.

28. The method of claim 27, wherein:

the attribute value engagement score of each of the plurality of attributes is based at least in part on an attribute popularity of an attribute of the plurality of attributes over a time period.

29. The method of claim 28, wherein:

the attribute popularity of the attribute of the plurality of attributes comprises at least one of:
 a number of clicks on the attribute of the plurality of attributes;
 a number of post-click add-to-carts of the attribute of the plurality of attributes; or
 a number of post-click orders of the attribute of the plurality of attributes.

30. The method of claim 21, wherein:

sorting the order of the set of the plurality of search results by the ranking of the plurality of attributes of the set of the plurality of search results comprises sorting the ranking of the plurality of attributes of the set of the plurality of search results by importance, the importance based at least in part on the context of the search query;

the method further comprises:
 re-ordering the set of the plurality of search results based on a value of a top-ranked attribute of the plurality of attributes, the top-ranked attribute of the plurality of attributes based on the ranking of the plurality of attributes of the set of the plurality of search results;

sorting the order of the set of the plurality of search results by the ranking of the plurality of attributes of the set of the plurality of search results is based at least in part on an engagement score of each of the set of the plurality of search results;

the engagement score of each of the set of the plurality of search results is based at least in part on a popularity of each search result of the set of the plurality of search results over a time period;

the popularity of each search result of the set of the plurality of search results comprises at least one of:
- a number of clicks on the search result of the set of the plurality of search results;
- a number of post-click add-to-carts of the search result of the set of the plurality of search results; or
- a number of post-click orders of the search result of the set of the plurality of search results;

sorting the order of the set of the plurality of search results by the ranking of the plurality of attributes of the set of the plurality of search results is further based at least in part on an attribute value engagement score of each of the plurality of attributes;

the attribute value engagement score of each of the plurality of attributes is based at least in part on an attribute popularity of an attribute of the plurality of attributes over a time period; and the attribute popularity of the attribute of the plurality of attributes comprises at least one of:
- a number of clicks on the attribute of the plurality of attributes;
- a number of post-click add-to-carts of the attribute of the plurality of attributes; or
- a number of post-click orders of the attribute of the plurality of attributes.

* * * * *